United States Patent
Schrix et al.

(10) Patent No.: US 8,856,528 B2
(45) Date of Patent: Oct. 7, 2014

(54) CHALLENGE-RESPONSE SYSTEM FOR MAINTENANCE OPERATIONS VIA RESPONDER FOR TELECOMMUNICATIONS CABINET

(75) Inventors: Lars Schrix, Duisburg (DE); Michael Mansholt, Köln (DE); Manuel Steinbrink, Korschenbroich (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/817,081

(22) PCT Filed: Jul. 28, 2011

(86) PCT No.: PCT/US2011/045710
§ 371 (c)(1),
(2), (4) Date: Feb. 14, 2013

(87) PCT Pub. No.: WO2012/027058
PCT Pub. Date: Mar. 1, 2012

(65) Prior Publication Data
US 2013/0160083 A1 Jun. 20, 2013

(30) Foreign Application Priority Data
Aug. 23, 2010 (EP) .................................... 10173747

(51) Int. Cl.
*H04L 9/12* (2006.01)
*G06F 21/44* (2013.01)
*H04L 9/32* (2006.01)
*H04L 7/10* (2006.01)
*G07C 9/00* (2006.01)
*H04L 29/06* (2006.01)

(52) U.S. Cl.
CPC ...... *G06F 21/44* (2013.01); *G07C 2009/00388* (2013.01); *G07C 9/00309* (2013.01); *H04L 9/3271* (2013.01); *H04L 63/08* (2013.01)
USPC ........................................... 713/168; 713/155

(58) Field of Classification Search
CPC ............ H04L 9/3271; H04L 29/06755; H04L 9/0813
See application file for complete search history.

(56) References Cited

U.S. PATENT DOCUMENTS

| 2003/0233546 A1 | 12/2003 | Blom |
| 2007/0226497 A1 | 9/2007 | Taylor |
| 2008/0159534 A1 | 7/2008 | Rager |

FOREIGN PATENT DOCUMENTS

| GB | 2 353 620 A | 2/2001 |
| JP | 2001-352323 A | 12/2001 |

(Continued)

OTHER PUBLICATIONS

An Authentication Protocol in a Security Layer for RFID Smart Tags. Feldhofer, Martin. IEEE(2004).*

(Continued)

*Primary Examiner* — Venkat Perungavoor
(74) *Attorney, Agent, or Firm* — Kristofor L. Storvick

(57) ABSTRACT

Method of performing a challenge-response process, comprising, in this sequence, the steps of a) providing a first challenge-response pair (50) on a source device (10), assigned to a responding device (30); b) loading the first challenge-response pair (50) from the source device (10) to a challenging device (20), while the source device (10) is operationally connected to the challenging device (20); c) performing a challenge-response process between the challenging device (20) and the responding devices (30) to which the first challenge-response pair (50) is assigned, d) loading one or more second challenge-response pairs (50) from a source device (10) to the challenging device (20), while the source device (10) is operationally connected to the challenging device (20), wherein the step of loading the first challenge-response pair (50) from the source device (10) to a challenging device (20) is performed before the challenging device (20) has received any information from one of the responding devices (30), to which the first challenge-response pair (50) is assigned.

12 Claims, 4 Drawing Sheets

(56) References Cited

FOREIGN PATENT DOCUMENTS

Figure 1:
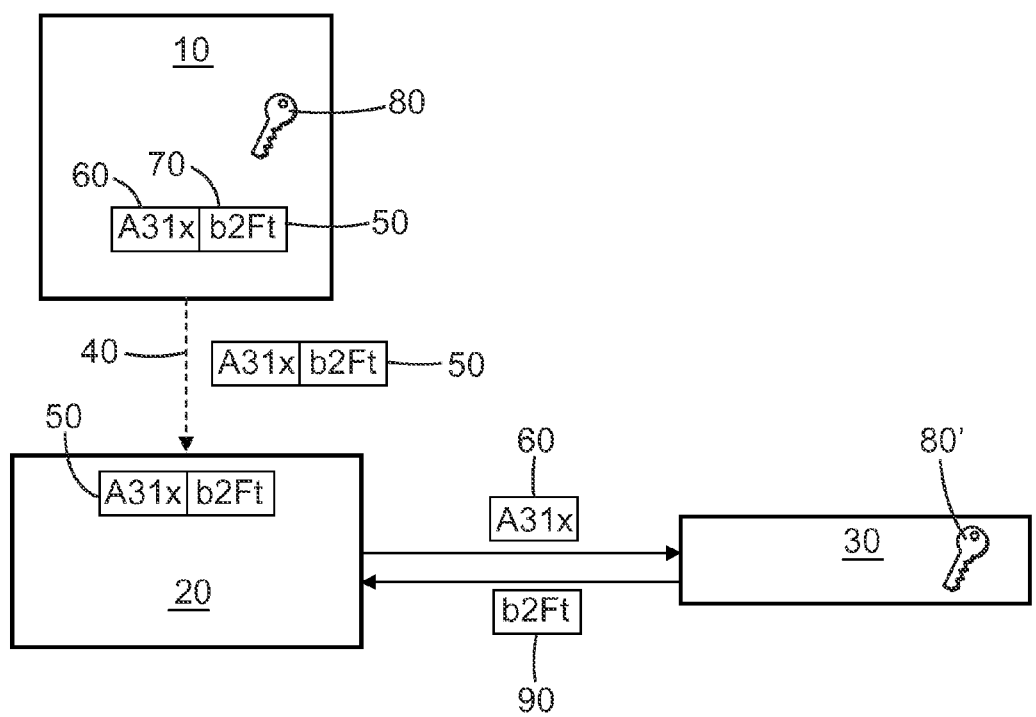

| WO | WO 02/095689 | 11/2002 |
| WO | WO 2007/036024 | 4/2007 |
| WO | WO 2007/041866 | 4/2007 |
| WO | WO 2007/104923 | 9/2007 |
| WO | WO 2007/131006 | 11/2007 |

OTHER PUBLICATIONS

Offline Hardware/Software Authentication for Reconfigurable Platforms. Simpson et al. INCS(2006).*

* cited by examiner

CHALLENGE-RESPONSE SYSTEM FOR MAINTENANCE OPERATIONS VIA RESPONDER FOR TELECOMMUNICATIONS CABINET

BACKGROUND

This invention relates to a method of performing a challenge-response process with pre-computed challenge-response pairs. The invention also relates to a computer program product, a system for performing such challenge-response processes and a combination of the system and a telecommunications cabinet.

In a challenge-response process, a challenging device sends a challenge message to a responding device, which sends a response message back to the challenging device. In the digital world, challenge-response processes are widely used in communication between digital devices. Often, one device performs a challenge-response process with another device in order to authenticate that other device.

Challenge-response processes can also be used in cryptographic applications. In some cryptographic applications of challenge-response processes, the challenging device holds a secret encryption key, which it uses to compute the "correct" response that it expects to receive from an authentic responding device upon sending a specific challenge to the responding device. If the challenging device is kept in a secured space, there is little risk that the encryption key might get compromised. However, if the challenging device is freely accessible, an attacker may have sufficient time to extract the encryption key from the challenging device, and abuse it.

In an effort to protect the secret key, the key is often not stored on the challenging device, but on a separate device, a source device, which may be located in a secured space, and which is at least temporarily operationally connected to the challenging device, for example, through a network. The source device generates challenge messages and computes for each challenge message the expected response message, using the secret key. It then provides the challenging device with these pairs of challenge messages and corresponding expected response messages, so-called challenge-response pairs or CRPs, which are stored on the challenging device. These CRPs enable the challenging device to perform a challenge-response process with a responding device and to verify the response it receives from the responding device, although the challenging device does not have the secret key. In a secure challenge-response process, CRPs are normally used only one single time, so that an attacker can not derive the expected response to a challenge from a previous challenge-response process.

Such a system is described in U.S. Patent Publication 2008/0159534, where an apparatus is used by devices to authenticate an accessory, and where a challenge and response memory stores challenges and pre-computed responses. An accessory receives a challenge from a device and generates a response thereto. An enabling circuit in the device compares the received response to the stored response.

In the International Patent Publication WO2007/041866, a mobile communication device is described that authenticates a smart battery prior to use. The device includes a main processor and device memory. The main processor sends an authentication request to the battery processor, which generates a response and sends it to the main processor. The smart battery is authenticated if the generated response matches security information stored on the device memory.

The security of challenge-response processes may be further enhanced by assigning a pre-computed challenge-response pair to certain responding devices, so that it can be used exclusively with these responding devices. In certain environments, a challenge-response pair is assigned to one single responding device. In this latter case, at least one challenge-response pair, assigned to this one responding device, must be present on the challenging device, before a challenge-response process can be performed between that specific responding device and the challenging device.

U.S. Patent Publication 2003/0233546A1 describes a challenge-response authentication procedure in which the overall authentication is initiated by a user transmitting a user ID to an intermediate party, which forwards the user ID to an associated authentication center in request for authentication data. Based on the received user ID, the authentication center identifies a secret key associated with the particular user.

Challenging devices are known that comprise challenge-response pairs for performing challenge-response processes with responding devices with which they have performed challenge-response processes before. An example may be a mobile phone network, in which an intermediate device holds challenge-response pairs for mobile phones that have been authenticated before. However, when a newly established responding device sends information, for example its digital identification or ID, to a challenging device in order to start a challenge-response process with that challenging device, a traditional challenging device had no pre-computed challenge-response pairs available that were assigned to that newly established responding device, so that the challenging device had to request loading of CRPs from a source device to the challenging device. While this loading of CRPs "on request" may be appropriate where the challenging device is permanently operationally connected to a source device, it does not allow for performing a challenge-response process with a newly established responding device when the challenging device is not operationally connected to the source device. A newly established responding device might thus, for example, remain unauthenticated and may not be allowed to perform its proper function, as long as the challenging device is not operationally connected to a source device, which might provide fresh CRPs to the challenging device. The present invention is addressing this problem.

SUMMARY OF INVENTION

The present invention provides a method of performing a challenge-response process, comprising, in this sequence, the steps of a) providing one or more first challenge-response pairs on a source device, wherein the first challenge-response pair is assigned to one or more responding devices;

b) loading the first challenge-response pair from the source device to a challenging device, while the source device is operationally connected to the challenging device;

c) performing a challenge-response process between the challenging device and one of the one or more responding devices to which the first challenge-response pair is assigned, using the first challenge-response pair, which is assigned to the responding device;

d) loading one or more second challenge-response pairs from a source device to the challenging device, while the source device is operationally connected to the challenging device, characterized in that the step of loading the first challenge-response pair from the source device to a challenging device is performed before the challenging device has received any information from one of the responding devices, to which the first challenge-response pair is assigned.

Challenge-response pairs (CRPs) are often generated on a source device, like, for example, a secured computer in a secured room. The CRPs may alternatively be generated on a further device, and then be transmitted to the source device.

Each CRP comprises a challenge and an expected response, but it may comprise further information. In order to generate the challenge, the source device often generates a random number of a certain number of bits, or in other words, it generates a random bit string of a certain length. The source device then uses the challenge, a secret key, and an algorithm to compute the expected response. In serious cryptography, secret keys typically have a length of a few tens of bits up to a few thousand bits. The expected response can only be computed with reasonable effort, if the secret key is known. Suitable algorithms are known to experts in the field of cryptography, like, for example the SHA-256 hashing algorithm. Once the challenge and the expected response are generated, they are combined into a CRP.

The CRP is often generated on or loaded to a device, the source device, that does not use it for a challenge-response process. Therefore, after generation of the CRP, the CRP is loaded, individually or as part of a group of CRPs, to a challenging device that is actually operable to perform a challenge-response process. The challenging device receives CRPs from a source device, i.e. a device that provides the CRPs to the challenging device.

The source device can load CRPs to a challenging device while the source device is operationally connected with the challenging device. If the devices are normally connected over a network connection, the source device can load CRPs to a challenging device only while the network is up, or, in other words, while the challenging device is in an online-mode with respect to the source device. If the devices are normally connected over a copper wire connection, the source device can load CRPs to the challenging device only while the copper wire connection is plugged in.

A CRP may be assigned to one or more responding devices. This assignment may be achieved, for example, by the CRP comprising information, in addition to the challenge and the response, which information is an indication of the responding device or the responding devices that the CRP is assigned to. If the CRP is assigned to one specific responding device, the CRP may, for example, comprise a unique digital ID of that specific responding device. If the CRP is assigned to a group of responding devices, the CRP may, for example, comprise a digital group identifier, that is common to all responding devices of the group of responding devices. Alternatively, the assignment may be achieved by the challenging device holding assignment information about CRPs that it comprises, where the assignment information may comprise an identifier of an individual responding device or of a group of responding devices.

Once the challenging device is provided with at least one CRP, it can perform a challenge-response process with a responding device to which the CRP is assigned, using this CRP. If the challenging device is provided with, for example, ten CRPs, it can perform ten challenge-response processes before it runs out of CRPs. A plurality of CRPs may be assigned to the same responding device, or to a plurality of responding devices. Allowing more than one use of a specific CRP is, in most systems, strictly prohibited, because this would severely deteriorate the cryptographic security of the entire system. Hence, once the challenging system runs out of unused CRPs assigned to one or more responding devices, it can normally not perform further challenge-response processes with any of these responding devices. In many systems, this situation never occurs, because the challenging device is always operationally connected with the source device and can always be provided with new CRPs.

There are, however, challenging devices that are not at all times operationally connected to a source device. This may be, for example, because a network connection is down, because the source device has broken down, or because the challenging device has intentionally been disconnected from a network in order to operate in an offline-mode for some time. While not being operationally connected to a source device, the challenging device may still perform challenge-response processes with responding devices, using the CRPs, assigned to those responding devices, that were loaded on the challenging device while the challenging device was still operationally connected to a source device. Only once all unused CRPs on the challenging device, that were assigned to specific responding devices, are used up in challenge-response processes, the challenging device has to be provided with new CRPs in order to be able to perform further challenge-response processes with those specific responding devices. In order to load new CRPs to the challenging device, a source device must again be operationally connected to the challenging device. The source device, from which CRPs were previously loaded to a challenging device may be different from the source device from which CRPs are later loaded to the same challenging device.

The loading of a first CRP, assigned to one or more responding devices, from the source device to the challenging device, before the challenging device has received any information from any one of the responding devices, to which the CRP is assigned, allows the challenging device to perform a challenge-response process with a newly established responding device, to which the CRP is assigned, while the challenging device is not operationally connected to a source device. In a specific example, the challenging device may thus be operated in an offline mode, even when the log-in of a newly built responding device is to be expected.

A newly established responding device may be a responding device that has never before been in operational contact or in communication with the challenging device. It may have been in contact with other challenging devices previously. In relation to a challenging device, a newly established responding device may be a responding device from which the challenging device has never before received any information. It may be a responding device that has just been manufactured, or one that has just been added to an existing group of responding devices, which may perform challenge-response processes with the challenging device.

Loading a CRP, assigned to one or more responding devices, to the challenging device, before the challenging device has received any information from any of the responding devices to which the CRP is assigned, permits the challenging device to perform a challenge-response process with a newly established responding device of the responding devices even when the challenging device is not operationally connected to a source device. In previously known challenge-response processes, the challenging device had no CRPs assigned to newly established responding devices, and it waited for receiving information, for example an authentication request, from a newly established responding device before one or more CRPs, assigned to that responding device, were loaded onto the challenging device from a source device. As a consequence, when a newly established responding device requested a challenge-response process with that challenging device for the first time at a time when the challenging device was not connected to a source device that might provide it with a CRP assigned to that newly established responding device, the challenging device could not perform a challenge-response process with the newly established responding device.

The loading of CRPs from the source device to the challenging device is only possible when these devices are operationally connected, i.e. when the challenging device is in an online-mode with respect to the source device. The method according to one aspect of the invention permits the actual challenge-response process with a newly established responding device to be performed while the source device and the challenging device are not operationally connected, i.e. when the challenging device is in an offline-mode with respect to the source device. The challenging device of the present invention can thus perform a challenge-response process with a newly established responding device in an offline mode or in an online mode with respect to the source device. Its availability for performing challenge-response processes is thereby increased with respect to challenging devices which can only perform a challenge-response process with a newly-established responding device while they are operationally connected to the source device.

A challenging device may receive information from a responding device. Information may, for example, be a digital identification or ID of a responding device. It may be other information, like, for example, information that requests the challenging device to perform a challenge-response process with that responding device. It may be information that in any way identifies a responding device or a group of responding devices, or discriminates a responding device or a group of responding devices from other responding devices or other groups of responding devices, respectively.

The method described above comprises the step of loading further, second CRPs from the source device to the challenging device after a challenge-response process has been performed. These newly loaded second CRPs enable the challenging device to perform further challenge-response processes with responding devices to which the newly loaded second CRPs are assigned. The total number of challenge-response processes, which the challenging device can perform, is thereby increased, and the usable operational lifetime of the challenging device is prolonged. Second CRPs that are loaded to the challenging device after loading a first CRP may or may not be assigned to one or more responding devices.

In a further aspect of the invention, the step of performing a challenge-response process between the challenging device and one of the one or more responding devices to which the first CRP is assigned, is performed while the challenging device is not operationally connected to the source device. Being able to perform a challenge-response process with a newly established responding device while the challenging device is not operationally connected to the source device is beneficial in times of, for example, a network outage. During a network outage, i.e. when the challenging device is not operationally connected to a source device, newly established responding devices can, for example, be authenticated by performing a challenge-response process, and they then can perform their proper function. This may be advantageous in environments where the network connection between the challenging device and a source device is unreliable. This may also be advantageous in environments where it is critical, for example, to authenticate newly established devices without interruption even when a connection is broken or a network is down, like, for example, in access control to some military installations.

In a further aspect of the invention, the challenging device may comprise a CRP and validity information, associated with the CRP, which validity information specifies one or more time periods during which the challenging device can validly use the associated CRP for performing a challenge-response process, and wherein the challenging device is adapted to use the associated CRP only during those time periods for performing a challenge-response process.

It may be advantageous to specify time periods for the validity of CRPs, because this may allow to control times during which challenge-response processes between a challenging device and responding devices can be performed, thereby controlling the times during which, for example, access to a cabinet can be granted to holders of responding devices. In embodiments where a CRP is uniquely assigned to a specific responding device, it may be particularly advantageous to specify time periods for the validity of a CRP, because this may allow to control times during which challenge-response processes between a challenging device and this specific responding device can be performed, thereby controlling, for example, access times for the owner or holder of a specific responding device. It may, in particular, be advantageous if a first CRP, which is assigned to one or more responding devices, and which may be used for performing a challenge-response process with a newly established responding device, is associated with validity information, because this may allow to establish time periods during which a newly established responding device can "register" with the challenging device. This, in turn, may enhance controllability and security of the entire communication system.

In a further aspect of the invention, the method described above may comprise, after the step of performing a challenge-response process, an additional step of the challenging device generating an access permission signal by which access is granted. In this additional step, the challenging device may comprise access time information specifying an access time period. The challenging device may be operable to generate the access permission signal only during the access time period. This may allow to control access through a mechanism which is independent from any validity information associated with CRPs. Access time information may comprise one or more access time periods. Access time information may be stored in a memory of the challenging device. Access time information may be logically associated with one or more specific responding devices. Access may, for example, be access to a closed space or to a device or to stored data. A closed space may, for example, be an interior of a telecommunication cabinet. The access permission signal may be an electrical or optical signal to open a door, e.g. an electrical signal that causes a lock to retract a locking bar so that a door can be opened. Once the step of performing a challenge-response process between the challenging device and one of the one or more responding devices to which the first challenge-response pair is assigned, is completed, the challenging device may then compare the current time to the access time periods stored on the challenging device, and if the current time is within one of the access time periods, it may generate an access permission signal by which access is granted. The challenging device may be adapted to generate the access permission signal only if the preceding step of performing a challenge-response process was successfully completed, and if the current time is within one of the access time periods comprised in the challenging device.

In yet another aspect, the invention provides a method as described above, wherein the challenge-response process is a cryptographic process. In a specific aspect, the challenge-response-process is a public-key cryptographic process.

Cryptographic challenge-response processes may provide higher security in communication. They may be used to securely authenticate devices and minimize the risk of faked responses, replay attacks, data tampering, and other attempts to interfere with the communication between a challenging device and a responding device.

A cryptographic process may be a symmetric cryptographic process or an asymmetric cryptographic process. Symmetric cryptography may provide for high speed authentication and it often requires less sophisticated infrastructure. Asymmetric cryptography, on the other hand, may increase the cryptographic security of a challenge-response process, because it may use two secret keys. The benefit of using CRPs in symmetric cryptographic challenge-response processes is evident, because there is only one secret key which is present both on the responding device and on the source device. The use of CRPs avoids the necessity to store a secret key on the challenging device, which may be accessible and/or insecure. The use of CRPs in asymmetric cryptography, for example in public-key cryptography, may be advantageous in scenarios where the computing power of the challenging device is limited.

In a further aspect, the challenge-response process is performed for authenticating a responding device, for example a newly established responding device. A newly established responding device is a responding device from which the challenging device has never before received any information. It is an advantage if the authentication of a newly established responding device can be performed using CRPs stored on the challenging device even at times when the challenging device is not operationally connected with a source device, i.e. in an offline mode. Offline authentication of responding devices may allow to run or to continue running important processes, even at times when a connection of the challenging device to the source device may be temporarily interrupted, as, for example, in case of a network outage or a failure or breakdown of the source device. Offline authentication may also be advantageous in situations where the challenging device is intentionally disconnected from the source device, for example, in order to operate it autonomously for a certain period of time. The ability to perform offline authentication may be particularly advantageous for portable challenging devices. Loading a certain number of CRPs, assigned to newly established responding devices, from the source device onto the challenging device, before the challenging device has received any information from one of those responding devices, may allow for autonomous authentication of newly established responding devices for a certain time, before the challenging device may run out of CRPs.

In a further aspect of the invention, communication between the challenging device and a responding device is performed in a wireless manner. A benefit of this is that the use of wireless communication may allow the use of highly-standardized RFID technology and other wireless technology in challenge-response processes, in which a connection between the challenging device and a source device may be unreliable or only be available temporarily, or in which the challenging device may be intentionally operated temporarily in an offline mode. An example of such a mode of operation is the authentication of goods, provided with active RFID tags, by a portable RFID reader through a challenge-response process.

In another aspect, the invention provides a method as described above, wherein the challenging device and the source device are at least temporarily operationally connected via a wired or wireless or optical fibre connection.

The invention also provides a computer program product comprising computer-executable instructions that, when carried out by one or more processors, cause the processor or the processors to perform any one of the methods described above. The methods of performing a challenge-response process according to the different aspects of the present invention may be implemented on one or more computers. The source device may comprise a computer and/or a processor. The challenging device may comprise a computer and/or a processor. A responding device may comprise a computer and/or a processor.

Some computer-executable instructions of the computer program product mentioned above may be adapted to be provided to a source device and to be carried out by a processor of the source device. Some of the instructions may be adapted to be provided to a challenging device and to be carried out by a processor of the challenging device. Some of the instructions may be adapted to be provided to a responding device and to be carried out by a processor of the responding device.

Carrying out one of the methods described above on one or more computers may provide for a high speed of the challenge-response process, and for flexibility when the need arises to change secret cryptographic keys or to set up new challenging devices or establish new responding devices for performing a challenge-response process according to the different aspects of the present invention.

The invention also provides a system comprising a source device, a challenging device, and a responding device, characterized by the system being operable to perform a method of performing a challenge-response process according to any one of the methods described above.

In a further aspect, the invention provides a system as described above, wherein the responding device is a mobile device.

In another aspect, the source device is operationally connectable to the challenging device over an internet-protocol ("IP") connection or over a transmission control protocol/internet protocol ("TCP/IP") connection.

The invention further provides a combination of a telecommunications cabinet and a system as described above, wherein the system is operable to perform a challenge-response process in order to control access to the interior of the telecommunications cabinet. It is particularly advantageous to use a system and the methods described above for access protection of a telecommunications cabinet, because such cabinets are often temporarily offline, i.e. a challenging device, that may control access to the telecommunications cabinet, may temporarily not be connected to a central computer which may serve as a source device and may provide CRPs for controlling access to the cabinet.

In a further aspect of the invention, the challenging device is accommodated in the telecommunications cabinet. Thereby, the challenging device may be protected by the cabinet and may be located close to the locking mechanism of the cabinet, so that access control signals can easily be transmitted inside the cabinet from the challenging device to the locking mechanism, and without being accessible to tampering or environmental impacts from outside the cabinet.

SHORT DESCRIPTION OF THE FIGURES

The present invention will now be described in more detail with reference to the following Figures, exemplifying particular embodiments of the invention.

Figure 2:
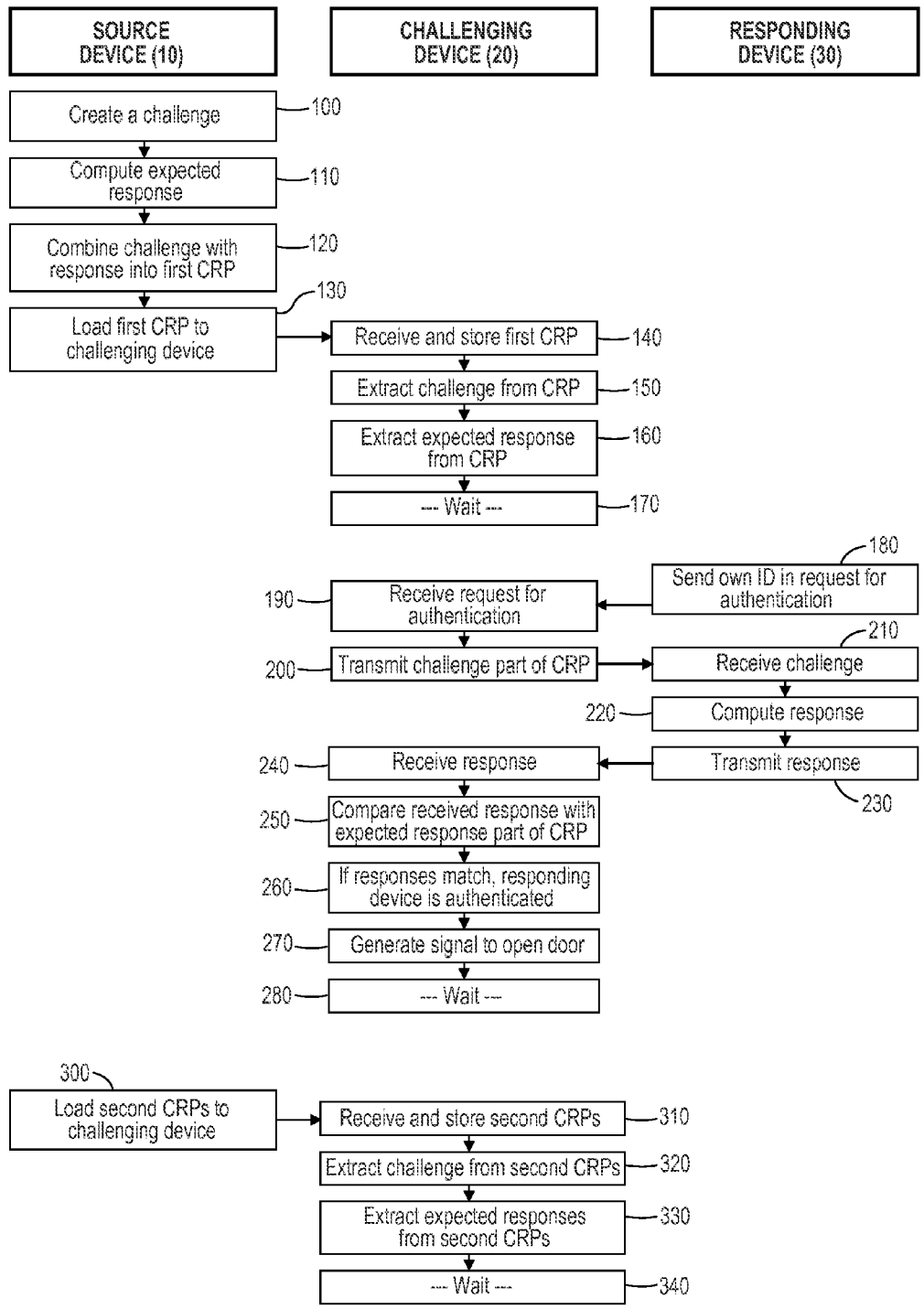
Figure 3:
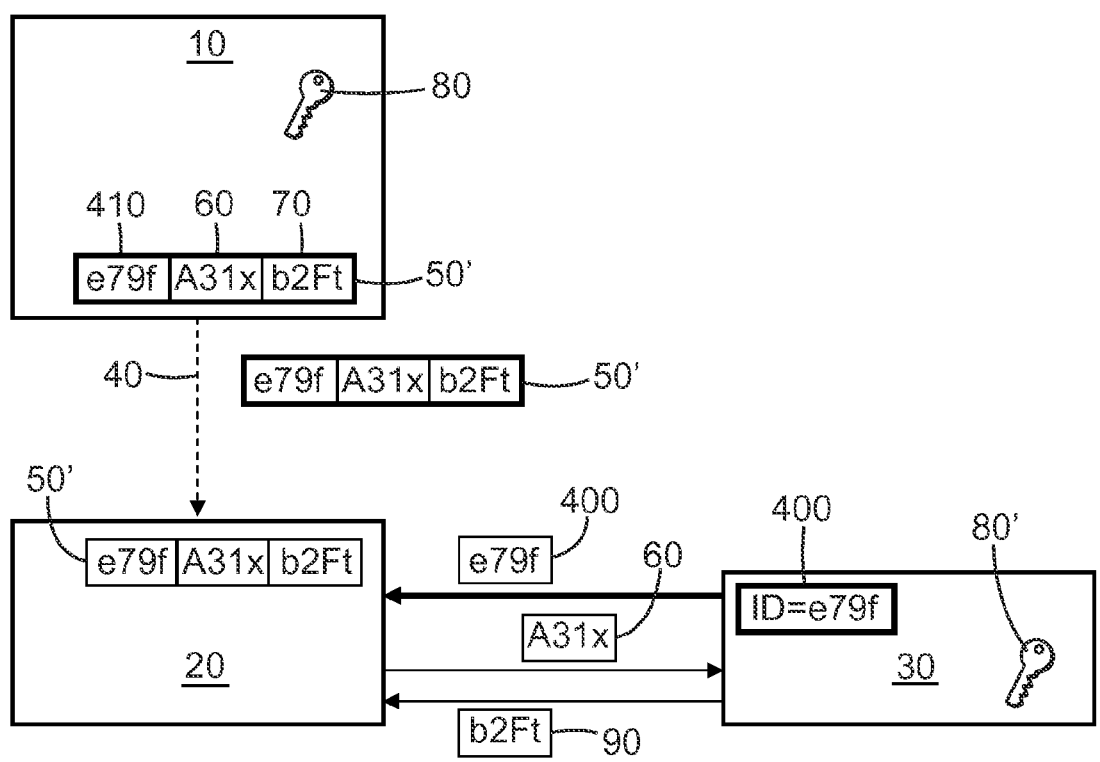

FIG. 1: Block diagram of a communication system and its elements, according to the invention;

FIG. 2: Flow chart of a challenge-response process according to the present invention;

FIG. 3: Block diagram of an alternative communication system and its elements, according to the invention, wherein a CRP is assigned to a responding device; and FIG. 4: Block diagram of a set of CRPs assigned to responding devices, with validity information.

DETAILED DESCRIPTION OF EMBODIMENTS

Herein below various embodiments of the invention are described and shown in the drawings wherein like elements are provided with the same reference numbers.

The block diagram of FIG. 1 shows a communication system comprising a source device 10, a challenging device 20 and a responding device 30, e.g. a newly established responding device, wherein the challenging device 20 authenticates the responding device 30 in a challenge-response process, which will be described in detail in FIG. 2. The source device 10 and the challenging device 20 are operationally connected over a connection 40, over which signals and/or data can be transmitted. This connection 40 is a network connection, but it may be a direct physical connection through wires or optical fibres, or it could be a wireless connection or any combination of those. The connection 40 may be unreliable or in other ways interrupted, deliberately or not, so that no connection may exist between the source device 10 and the challenging device 20 for certain periods of time.

In the embodiment described here, the source device 10 is a computer in a secured back office of a telecommunications network operator, and the challenging device 20 is a data processing system in a telecommunications cabinet of the network, located typically in a street. The responding device 30 is an RFID-enabled key, assigned to and held by an installer of a telecommunications system or a person charged to perform maintenance on devices contained in the telecommunications cabinet.

The source device 10 and the responding device 30 have identical secret keys 80, 80', which they use independently in a suitable, known algorithm to compute a response to a challenge 60. In this simplified example, the challenge 60 consists of the characters "A31x" and the expected response 70 consists of the characters "b2Ft", however, in reality, the challenge 60 is a 128-bit random number, and the expected response 70 also comprises 128 bits. The challenge 60 and the expected response 70 are comprised in a challenge-response pair ("CRP") 50. The source device 10 and the challenging device 20 may comprise many CRPs 50, but for clarity, only one CRP 50 is shown in FIG. 1. Because the secret keys 80, 80' in the source device 10 and in the responding device 30 are identical, the CRP 50 of which the expected response 70 was computed using the key 80, is assigned to the responding device 30. The actual response 90 is computed by the responding device 30 and transmitted by the responding device 30 to the challenging device 20.

The flow diagram of FIG. 2 explains individual logical steps of a challenge-response process according to the invention. Steps performed on or by the source device 10 are listed in the leftmost column, steps performed on or by the challenging device 20 are listed in the center column, and steps performed on or by a responding device 30 appear in the rightmost column, whereby the time progresses from the top towards the bottom of the diagram.

In step 100, a challenge 60 is created on the source device 10, using a random number generator. The challenge 60 has a length of 128 bits. The challenge 60 is stored in a memory of the source device 10. Although in this embodiment, the challenge 60 is created on the source device 10, challenges 60 may also be created on a different device and then be transferred onto the source device 10.

In step 110, the source device 10 computes, based on the challenge 60, a corresponding expected response 70 and stores the expected response 70 in its memory. The expected response 70 is computed using a secret key 80. Algorithms for computing responses from challenges, using secret keys, are known in the art of cryptography. For a specific challenge 60, the expected response 70, computed using the secret key 80 on the source device 10, is identical to the response that a responding device 30 will transmit upon receiving the specific challenge 60, if the responding device 30 uses the same, identical secret key 80' for computing the transmitted response 90 as the source device 10 used to compute the expected response 70. Thereby, the challenge 60 and the expected response 70 are assigned to one or more responding devices 30 that use the identical secret key 80'. A responding device 30 that does not have the identical secret key 80' will not compute a "correct" transmitted response 90.

The step 110 of computing the expected response 70 may alternatively be done on a different device, and the expected response 70 may then be transferred to the source device 10.

The source device, in step 120, combines the challenge 60 with the corresponding expected response 70 to form a first challenge-response pair ("CRP") 50 and stores the first CRP 50 in its memory. The CRP 50 is assigned to the responding device 30 by virtue of the identical secret keys 80, 80' used to compute the expected response 70 and the actual response 90, respectively. Other responding devices 30 may comprise the identical secret key 80'. By virtue of the identical secret keys 80, 80', the first CRP 50 is then also assigned to those other responding devices 30. Besides one challenge 60 and one corresponding expected response 70, a CRP 50 may contain other information. It may, for example, contain a checksum or an identification number or ID which identifies the specific CRP 50.

Also the step 120 of combining a challenge 60 and a response 70 to form a first CRP 50 may alternatively be done on a different device, such that the newly formed CRP 50 is loaded from that different device to the source device 10.

In step 130, the source device 10 loads the first CRP 50 from its memory to the challenging device 20 via a network connection 40. This loading is done while the source device 10 is operationally connected to the challenging device 20, i.e. when data can be transmitted over the connection 40 between them. The loading of the first CRP 50 is performed at a time before the challenging device 20 has received any information from any responding device 30, to which the first CRP 50 is assigned, for example any information for requesting authentication. In the embodiment described here, one first CRP 50 is loaded. In general, any number of first CRPs 50 may be loaded, for example one CRP 50, ten CRPs, twenty CRPs or any other number of CRPs. The number of CRPs 50 loaded is chosen such that the challenging device 20 can store all transmitted CRPs 50 in its memory.

The challenging device 20 receives, in step 140, the first CRP 50 transmitted by the source device 10. In steps 150 and 160, the challenging device 20 extracts the challenge 60 and the expected response 70 from the first CRP 50 and stores them in its memory, such that the logical relationship between the challenge 60 and the corresponding expected response 70 is maintained.

The challenging device 20 is now provided with a first CRP 50 which can be used for authentication of responding devices 30 to which the CRP 50 is assigned. The challenging device 20, in step 170, waits for a responding device 30 to request authentication.

At some point in time, a newly established responding device 30 transmits its own unique digital identification number ("ID") in a request for authentication, as shown in step 180. The responding device 30 thereby requests the challenging device 20 to initiate a challenge-response process between the challenging device 20 and the responding device 30. In the embodiment described here, in which the responding device 30 is an RFID-enabled key, the responding device 30 communicates with the challenging device 20 in a wireless manner, i.e. over an air interface.

The challenging device 20 receives, in step 190, the request for authentication from the newly established responding device 30 and transmits, in step 200, the challenge part 60 of the first CRP 50, which had been extracted from the CRP 50 in step 150, to the responding device 30.

Once the newly established responding device 30 has received the challenge 60 in step 210, it computes in step 220 a response 90 from the challenge 60 and the secret key 80' that is stored on the responding device 30. The responding device 30 transmits the computed response 90 to the challenging device 20 in step 230.

The challenging device 20 receives the transmitted response 90 in step 240 and compares, in step 250, the received transmitted response 90 with the expected response 70, which had been extracted from the CRP 50 in step 160. If the received response 90 matches the expected response 70, the newly established responding device 30 has successfully authenticated itself to the challenging device 20, as is shown in step 260. In the embodiment described here, the challenging device 20, after a successful authentication of a responding device 30, generates an electrical signal, in step 270, to open a door, e.g. an electrical signal that causes a lock to retract a locking bar, so that a door of a telecommunications cabinet can be opened.

Should the received response 90 not match the expected response 70 (not shown in FIG. 2), the authentication of the responding device 30 has failed, and the challenging device 20 does not generate a signal to open the cabinet door.

Successful authentication of a responding device 30 may also generate, in step 270, an electrical signal to open a door of an access-controlled building or room or to start the engine of a vehicle. Successful authentication may also generate a digital electrical signal in a computer, for example to log in a user into the operating system or into an application running on the computer. In case of an unsuccessful authentication, an alarm may be triggered.

The authentication of a newly established responding device 30 by the challenging device 20, which is performed by executing the steps 180 to 280 in FIG. 2, can be performed while the challenging device 20 is not operationally connected to the source device 10, because the first CRP 50 had been loaded to the challenging device 20 before the challenging device 20 received any information from any responding device 30 to which the first CRP 50 is assigned. The authentication can alternatively be performed while the challenging device 20 is operationally connected to the source device 10. The sequence of steps may remain the same as the one shown in FIG. 2.

In the embodiment according to FIG. 2, the source device 10 loads a number of second CRPs 50 to the challenging device 20, as shown in step 300. These second CRPs 50 are loaded after a predetermined time to the challenging device 20 while the source device 10 is operationally connected to the challenging device 20, i.e. when data can be transmitted over the connection 40 between the source device 10 and the challenging device 20.

The challenging device 20 receives, in step 310, the second CRPs 50 transmitted by the source device 10 and stores them. Similar to steps 150 and 160 described above, the challenging device 20 extracts, in steps 320 and 330, the challenge 60 and the expected response 70 of each of the second CRPs 50 and stores them in its memory, such that the logical relationship between each specific challenge 60 and the corresponding expected response 70 is maintained. The challenging device 20 is now provided with a set of second CRPs 50 which can be used in further challenge-response processes for further authentication of responding devices 30, newly established or not. The challenging device 20, in step 340, waits for a next responding device 30 to transmit its ID 400 in a request for authentication.

A CRP 50 may be assigned to a specific responding device 30. In an embodiment of the invention, shown in FIG. 3, a digital identification number ("ID") 400 unambiguously identifies a responding device 30. The ID 400 is stored in the memory of the responding device 30 which it identifies. In the embodiment, the ID 400 consists of 32 bits, but it could comprise any number of bits. In FIG. 3 it is shown to comprise a number of bits that corresponds to four characters only for the reason of clarity.

A CRP 50' that is assigned to a specific responding device 30 comprises, beyond a challenge 60 and a corresponding expected response 70, the target ID 410 of the responding device 30 to which the CRP 50' is assigned. When the responding device 30 requests authentication by transmitting its ID 400, the challenging device 20 uses for authentication a first CRP 50' stored in its memory which comprises a target ID 410 that is identical to the ID 400 received from the responding device 30. The challenging device 20 transmits the challenge 60 of that CRP 50' to the responding device 30 and receives the actual response 90 from the responding device 30.

First CRPs 50' that are assigned to one or more responding devices 30 can only be used for authentication of a newly established responding device 30 to which they are assigned. Not loading a CRP 50' comprising the target ID 410 of a specific newly established responding device 30 to the challenging device 20 ensures that this specific newly established responding device 30 can not be successfully authenticated and thus not gain access to the telecommunications cabinet. In such a case, when the specific responding device 30 requests authentication by transmitting its ID 400, the challenging device 20 will transmit a challenge 60, but it will not perform a challenge-response process with the specific responding device 30, so that no access to the telecommunications cabinet is granted. A challenge 60 is transmitted in spite of a mismatch in the IDs, so that an unauthorized responding device 30, i.e. one for that no first CRP 50' on the challenging device 20 is assigned, requesting authentication can not draw any conclusions from the fact that it might not receive a challenge 60 at all.

Figure 4:
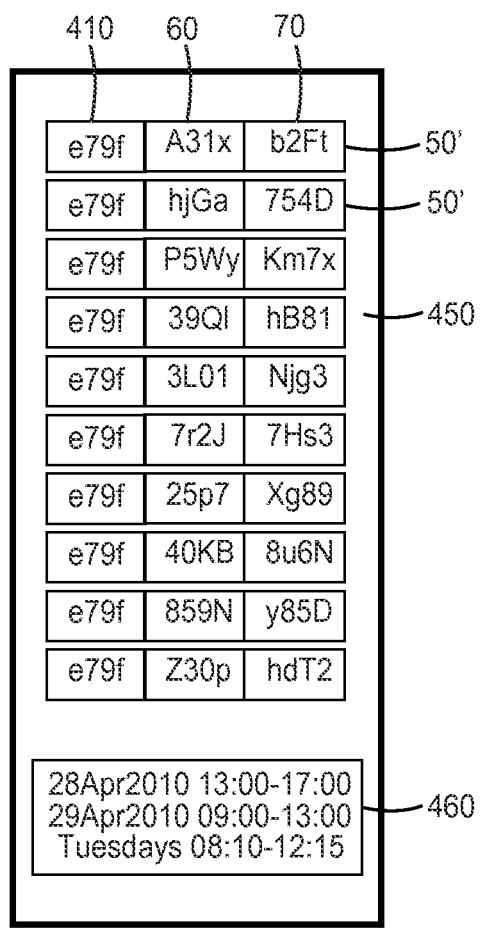

In a specific embodiment of the invention, the source device 10 sends a set 450 of first CRPs 50' to a challenging device 20, wherein the set 450 not only comprises CRPs 50', but also comprises validity information 460 for all the CRPs 50' comprised in the set 450. The set 450 and its content is shown in FIG. 4. The set 450 comprises ten CRPs 50', each of which comprises a target ID 410, through which each first CRP 50' of the set 450 is assigned to one or more newly established responding devices 30. In the case shown, all CRPs 50' comprise the same target ID 410 "e79f" and are thereby assigned to responding devices 30 having the same ID 400. The set 450 further contains validity information 460, which specifies time periods during which the challenging device 20 can validly use the first CRPs 50' of the set 450 for performing challenge-response processes. In the challenging device 20 that has received the set 450, each first CRP 50' in the set 450 is logically associated with the validity information 460.

When a newly established responding device 30 sends its ID 400 in request for authentication, the challenging device 20, before it transmits the challenge 60 comprised in a selected first CRP 50' to the responding device 30, compares the target ID 410 in the CRP 50' with the ID 400 of the responding device 30 requesting authentication. If the target ID 410 matches the ID 400, the CRP 50' may be used in a challenge-response process with that newly established responding device 30. The challenging device 20 then compares the current time with the time periods specified in the validity information 460 associated with the selected first CRP 50'. If the current time is within any one of the time periods specified in the validity information 460 logically associated with the selected first CRP 50', it transmits the challenge 60 and performs a challenge-response process. If the current time is not within any of the time periods specified in the validity information 460 of the selected first CRP 50', it checks other first CRPs 50' assigned to the responding device 30 if they can be validly used for performing a challenge-response process with the newly established responding device 30 at the current time. If no suitable first CRP 50' is found, it transmits a challenge 60, but it does not perform a challenge-response process with the newly established responding device 30, so that no access to the telecommunications cabinet is granted. The challenge 60 is transmitted in spite of a mismatch in the allowed times, so that a newly established responding device 30 requesting authentication outside its allowed time periods can not draw any conclusions from the fact that it might not receive a challenge 60 at all.

The invention claimed is:

1. A machine-implemented method of performing a challenge-response process, comprising, in this sequence, the steps of
    a) providing a first challenge-response pair on a source device, wherein the first challenge-response pair is assigned to one or more responding devices;
    b) loading the first challenge-response pair from the source device to a challenging device, while the source device is operationally connected to the challenging device;
    c) performing a challenge-response process between the challenging device and one of the one or more responding devices to which the first challenge-response pair is assigned, using the first challenge-response pair, which is assigned to the responding device;
    d) loading one or more second challenge-response pairs from a source device to the challenging device, while the source device is operationally connected to the challenging device,
    characterized in that the step of loading the first challenge-response pair from the source device to a challenging device is performed before the challenging device has received any information from one of the responding devices, to which the first challenge-response pair is assigned.

2. A machine-implemented method according to claim 1, wherein the step of performing a challenge-response process between the challenging device and one of the one or more responding devices to which the first challenge-response pair is assigned, is performed while the challenging device is not operationally connected to the source device.

3. A machine-implemented method according to claim 1, wherein the challenging device comprises a challenge-response pair and validity information, associated with the challenge-response pair, which validity information specifies one or more time periods during which the challenging device can validly use the associated challenge-response pair for performing a challenge-response process, and wherein the challenging device is adapted to use the associated challenge-response pair only during those time periods for performing a challenge-response process.

4. A machine-implemented method according to claim 1, comprising, after the step of performing a challenge-response process, the additional step of the challenging device generating an access permission signal by which access is granted.

5. A machine-implemented method according to claim 1, wherein the challenge-response process is a cryptographic process.

6. A machine-implemented method according to claim 1, wherein the challenge-response process is performed for authenticating a responding device.

7. A machine-implemented method according to claim 1, wherein communication between the challenging device and a responding device is performed in a wireless manner.

8. System comprising a processor, a source device, a challenging device, and a responding device, characterized by the system being operable to perform a method of performing a challenge-response process according to claim 1.

9. System according to claim 8, wherein the responding device is a mobile device.

10. System according to claim 8, wherein the source device is operationally connectable to the challenging device over an internet-protocol ("IP") connection or over a transmission control protocol/internet protocol ("TCP/IP") connection.

11. Combination of a telecommunications cabinet and a system according to claim 8, wherein the system is operable to perform a challenge-response process in order to control access to the interior of the telecommunications cabinet.

12. Combination of a telecommunications cabinet and a system according to claim 11, wherein the challenging device is accommodated in the telecommunications cabinet.

* * * * *